United States Patent

Eichhorn et al.

[11] Patent Number: 5,823,640
[45] Date of Patent: Oct. 20, 1998

[54] METHOD AND DEVICE FOR DRIVING AN ELECTROMAGNETIC VALVE

[75] Inventors: Alexander Eichhorn, Neckarsulm; Helmut Wiss, Moglingen, both of Germany

[73] Assignee: Robert Bosch GmbH, Stuttgart, Germany

[21] Appl. No.: 776,686

[22] PCT Filed: May 5, 1995

[86] PCT No.: PCT/DE95/00588

§ 371 Date: Feb. 18, 1997

§ 102(e) Date: Feb. 18, 1997

[87] PCT Pub. No.: WO96/05992

PCT Pub. Date: Feb. 29, 1996

[30] Foreign Application Priority Data

Aug. 22, 1994 [DE] Germany .................. P 44 29 373.9

[51] Int. Cl.⁶ .................. B60T 8/36; F16D 1/16; F16K 31/02
[52] U.S. Cl. .................. 303/119.2; 303/119.1; 303/DIG. 8; 137/14; 137/487.5; 251/129.05
[58] Field of Search .................. 303/9.62, 113.5, 303/116.1, 119.2, DIG. 1, DIG. 8; 188/181 R; 137/1, 14, 487.5; 251/129.05

[56] References Cited

U.S. PATENT DOCUMENTS

| 4,361,164 | 11/1982 | Sakakitava et al. .................. 137/14 |
| 5,647,387 | 7/1997 | Isutsui .................. 137/1 |

FOREIGN PATENT DOCUMENTS

| 0376493 | 7/1990 | European Pat. Off. . |
| 0452562 | 10/1991 | European Pat. Off. . |
| 3623908 | 1/1988 | Germany . |
| 41 10 245 | 10/1992 | Germany . |
| 4110245 | 10/1992 | Germany . |
| 4141354 | 6/1993 | Germany . |
| 4140586 | 1/1994 | Germany . |
| 4305488 | 8/1994 | Germany . |

*Primary Examiner*—Robert J. Oberleitner
*Assistant Examiner*—Chris Schwartz
*Attorney, Agent, or Firm*—Kenyon & Kenyon

[57] ABSTRACT

A method and device for driving an electromagnetic valve, in particular an electromagnetic valve of a braking system having antilock protection and/or a traction control system. When switched over into the position that permits the passage of flow, the valve is so driven that, in a first phase for a specifiable time (DT), the current falls off in accordance with a first function and remains nearly constant over time in a second phase.

5 Claims, 2 Drawing Sheets

METHOD AND DEVICE FOR DRIVING AN ELECTROMAGNETIC VALVE

BACKGROUND INFORMATION

The invention relates to a method and a device for driving an electromagnetic valve, in particular an electromagnetic valve of a braking system having antilock (wheel lock-up) protection and/or a traction control system.

A method and a device of this kind are disclosed by the German Patent Laid-Open publication no. 4 141 354. It describes a method and a device whereby by varying the frequency, the pulse width or the pulse duration/interpulse (mark-to-space) ratio, the valve is so driven that the valve needle assumes a floating position, however, does not completely open or close.

In addition, a device for driving an electromagnetic valve is disclosed by the German Patent Laid-Open publication no. 4 110 254. It describes interrupting the drive current once or several times when driving the valve to achieve a softer closing of the solenoid valve and to avoid disturbing hydraulic noises.

In hydraulic braking systems having antilock protection and/or a traction control system, noises occur particularly when opening and closing the solenoid valve. However, these noises cannot be avoided with the existing device under the state of the art.

SUMMARY OF THE INVENTION

Given a method and a device for driving an electromagnetic valve, of the type mentioned at the outset, the underlying object of the invention is to minimize the noises that occur when switching (operating) the valve.

The invention provides for the drive current characteristic to be so formed that the valve needle is prevented from hitting forcefully against the limit stop, since the lift stroke is smaller and is not run through as quickly. Also, the usual hydraulic vibrations experienced during valve opening are not produced, so that sound emissions are clearly reduced.

DETAILED DESCRIPTION OF THE DRAWINGS

To modulate the pressure prevailing in the individual brakes of a vehicle equipped with antilock protection or a traction control system, it is generally known to use electrically actuated supply valves and discharge valves. For this purpose, it is preferable to use two-way valves, i.e., hydraulic valves, which have only two switching positions (open or closed). The desired pressure build-up or pressure-reduction gradient is achieved by driving the valves with series of pulses and by varying the pulse-duration/interpulse (mark-to-space) ratios.

The supply valve, which is inserted in the brake line between the brake-force sensor or the main cylinder and the brake, is generally switched to allow flow in its neutral position, while the discharge valve, which is used to bleed off pressure, in its neutral position, blocks the hydraulic fluid's path to the return-flow pump or to the pressure-equalizing reservoir.

In place of the supply/discharge valve pairs, valve arrangements having three switch positions (pressure buildup, pressure stabilization, and pressure reduction) may also be used.

In addition, so-called proportional valves are used, which release a flow-through port in proportion to the driving signal. Such proportional valves are expensive and require a complex drive circuit.

The disadvantage associated with the known control aided by the high-speed switching valves is that the rapid armature movements produce local decelerations and accelerations in the hydraulic fluid, so that substantial noises are generated. Such noises are perceived as disturbing in antilock protection or traction control systems. These noises are especially troublesome when an active braking intervention is carried out by the traction control system, especially when it is performed to limit or control driving speed.

Figure 1:
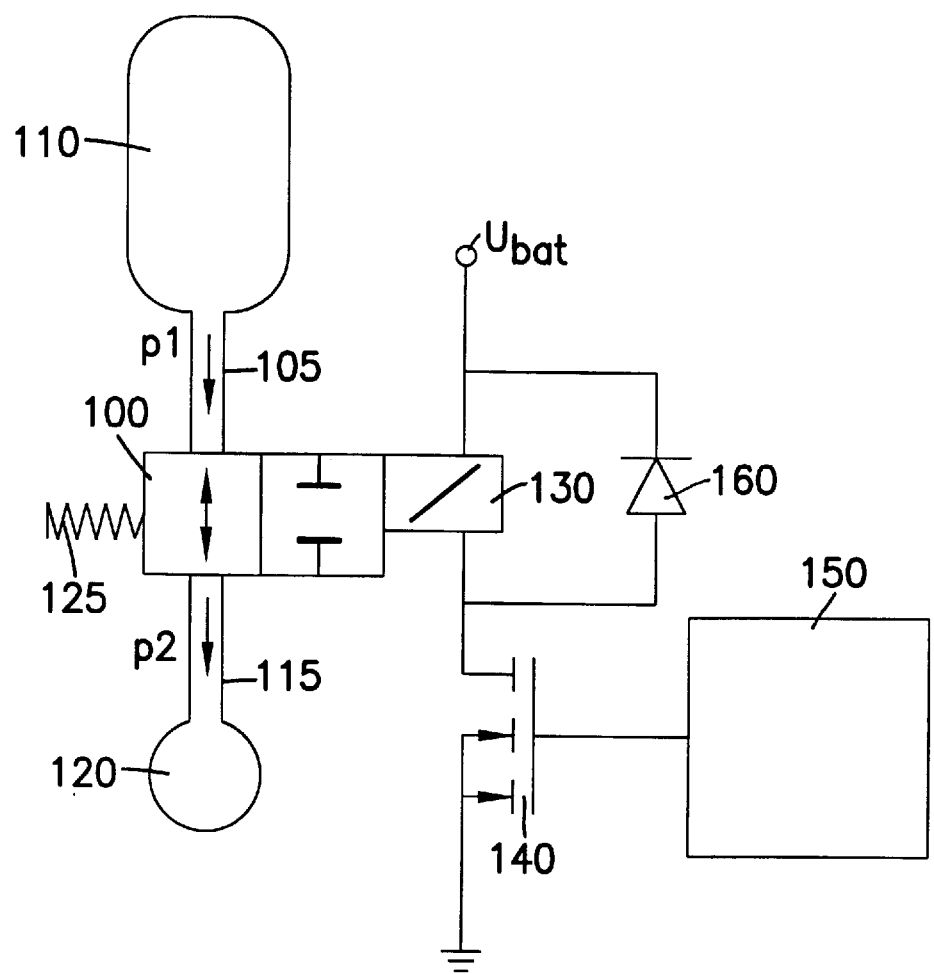
FIG. 1 shows a schematic illustration according to the present invention.

FIG. 1 illustrates the relationships based on the example of a supply valve of an antilock protection and/or traction control system. The described drive circuit is not limited solely to the driving of the supply valve in a braking system having antilock protection and/or traction control. The greatest improvements are realized for this supply valve, however, with respect to noise emissions. The described procedure can, however, also be employed when working with other valves in the area of the braking system, or in other applications where such problems occur.

Supply valve 100 communicates through its first connection via a first line 105 with master brake cylinder 110. A pressure P1 prevails in the first line. The second connection of solenoid valve 100 communicates via a second line 115 with brake 120. Pressure P2 prevails in the second line.

The illustrated solenoid valve is a so-called 2/2 solenoid valve, which can assume two end positions. In the neutral position, as long as no current (second value) is flowing, solenoid valve 100 releases the passage to permit flow between the first line 105 and the second line 115. In this position, solenoid valve armature is retained by a spring 125. A current of a first value I1 traverses a coil 130, causing a force to be exerted against spring tension FF, which brings the valve into its closed position. The procedure according to the invention is applicable to solenoid valves, which enable the passage of flow in their current-carrying state.

Coil 130 is connected via its first electrical connection terminal to a supply voltage Ubat and via a second connection terminal to a switching element 140. A field-effect transistor is preferably used as a switching element. The control current terminal of the switching element or the gate terminal of field-effect transistor 140 is connected to a control unit 150. By closing the switching element, the current from the supply voltage is released to flow through coil 130 and through switching element 140 to the mass frame connection.

A free-wheeling diode 160 is connected between the first and second terminal connection of coil 130. In this case, the cathode of the diode is connected to the supply voltage and the anode to the switching element.

Control unit 150 is preferably an antilock protection and/or traction control system. It processes various signals from different sensors or other control units, such as from a speed-control or a speed-limitation unit.

On the basis of these signals (not shown), control unit 150 designates signals for driving coil 130 of electromagnetic valve 100. If coil 130 receives a current, then it applies a force FM. This force FM induces the solenoid valve to go over into its second position, the closed position. In this case, no pressure compensation is possible between the first line 105 and the second line 115.

A pressure difference is formed, which corresponds to the difference between pressure values P1 and P2. In this case, pressure P2 is smaller than pressure P1.

A pulse-width modulated signal is preferably applied to switching element 140 by control unit 150, however a different activation can also be provided. A corresponding current I flows through coil 130 as a function of the pulse duty factor PWM of the pulse-width modulated signal. The relation $$FM = A*I + B$$

holds for the force FM applied by the coil. A and B are constants.

A resulting force FZ is needed to move the solenoid valve against the force of spring FF. To apply a resulting force FZ to move the solenoid valve armature, the current requires a third value I2, expressed by the following equation:

$$I2 = (FF + FD - FZ - B)/A$$

In this case, the force FD is dependent upon the pressure difference between the pressure P1 prevailing in the first line 105 and the pressure P2 in the second line 115.

The solenoid valve is driven so as not to go over completely from its closed position into its open position, but rather to assume an intermediate position. This intermediate position depends upon the resulting force FZ. Given a known differential pressure and, thus, a known force FD, the current can be set to a value I2 to adjust a specific resulting force FZ and, thus, a specific opening cross-section and pressure gradient.

Value I2 is selected to lie between the first current value I1 and the second current value. The first current value I1 holds the solenoid valve in its closed position. The second current value holds the solenoid valve in its open position. In the specific embodiment shown, this value is zero.

Thus, to achieve a specific reduction in pressure, a current I2 is specified as a function of the differential pressure between pressure P1 in the first line and pressure P2 in the second line. In the preferred exemplary embodiment, this is achieved in that switching element 140 is driven with a specific pulse duty factor of a pulse-width modulated signal. The pulse duty factor corresponds to the ratio between the on duration and the period duration of the pulse-width-modulated driving signal.

Alternatively to an activation with a pulse-width modulated signal, a suitable switching element, in particular a transistor can be used to specify an appropriate control voltage in order to adjust a suitable current characteristic.

In FIG. 2, the pulse duty factor PWM of the pulse-width modulated signal, the current I flowing through the solenoid valve, and pressures P1 and P2 are plotted over time.

Figure 2A:
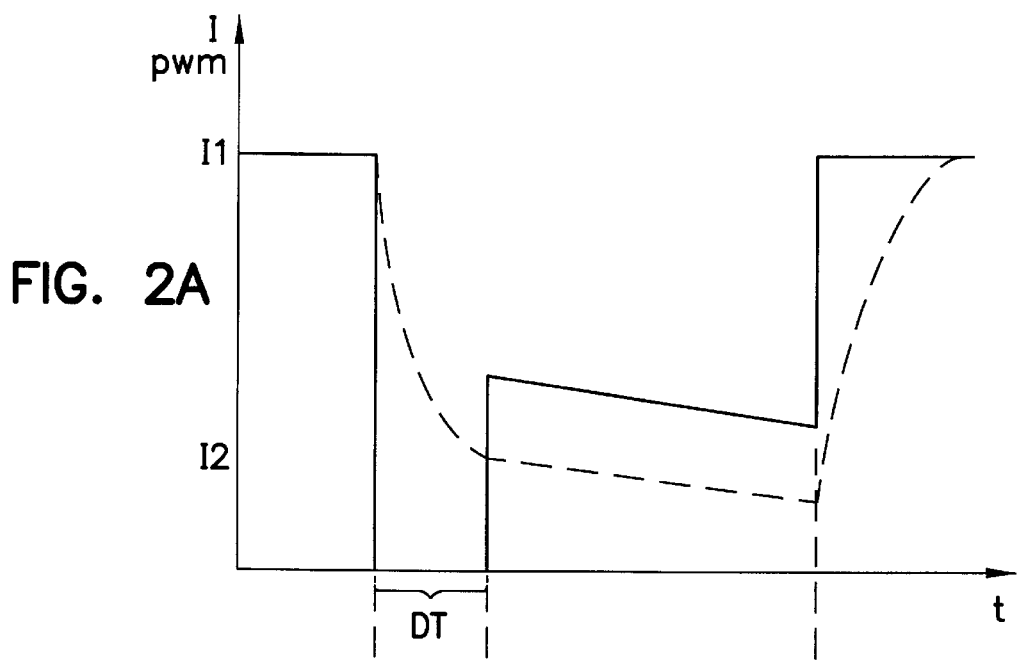
FIG. 2a shows a first signal timing plot of signals according to the present invention.
Figure 2B:
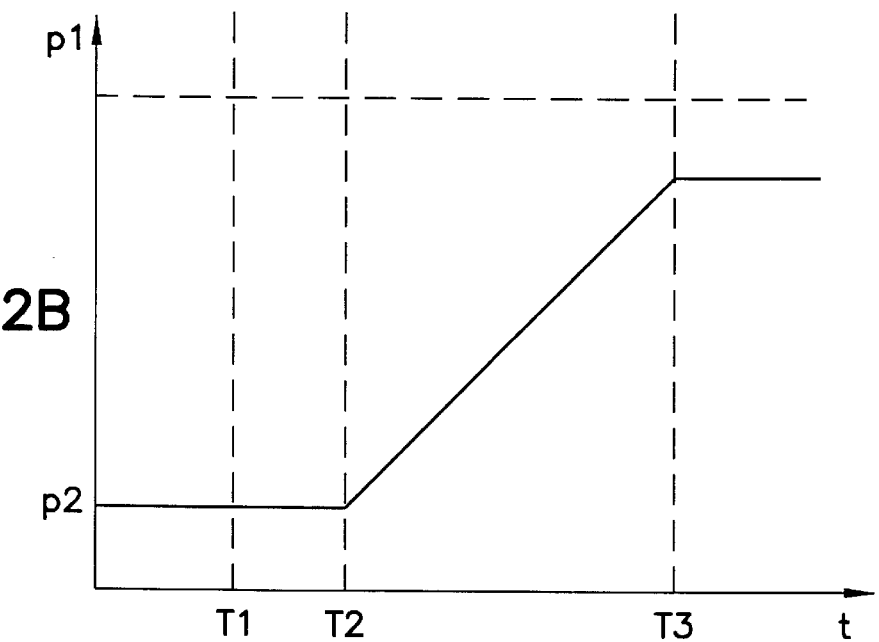
FIG. 2b shows a second signal timing plot of signals according to the present invention.

In FIG. 2a, the pulse duty factor (PWM) of the pulse-width modulated signal is plotted with a solid line. The resultant current I is plotted with a dashed line. In FIG. 2b, pressure P1 is plotted with a dashed line, and pressure P2 with a solid line.

In a first approximation, pressure P1 assumes a constant value. In response to a closed solenoid valve, pressure P2 assumes a low value and then, in response to the opening of solenoid valve, rises nearly linearly to a second value, which lies more or less under the value of pressure P1. The value by which the pressure rises within a specific time is described as the pressure gradient. The pressure can also assume other characteristic curves over time, in particular between instants T2 and T3.

Up until instant T1, a pulse duty factor is specified, which results in a current with the first value I1. A pulse duty factor of 1 is preferably specified, signifying that switching element 140 is constantly closed. Current value I1 is the current value required to hold the solenoid valve in its closed position.

Up until instant T1, the solenoid valve is in its closed state. The solenoid valve opens between instants T1 and T2. FIG. 2 illustrates the case where the solenoid valve first opens immediately before instant T2.

At instant T1, control unit 150 designates a signal which should effect a build-up of pressure P2 in the brake. For that reason, the pulse duty factor reverts to a smaller value at instant T1. In the depicted example, starting with instant T1, a pulse duty factor of 0 is specified, which means that switching element 140 is open. Because of free-wheeling diode 160, current I, which flows through coil 130, decreases exponentially over the time t to the third value I2, which lies above the second value at which the solenoid valve is in its flow-through position.

At instant T2, the current reaches its third desired value I2. Starting with this instant, a pulse duty factor is specified, which is required to sustain the current I2. The pulse duty factor PWM is selected accordingly.

In the depicted arrangement comprising a free-wheeling diode and a pulse-width modulation activation, the following relation applies for the time span DT between instants T1 and T2:

$$DT = -T*\ln(PWM)$$

The variable PWM is the pulse duty factor which is defined by the relation $$PWM = I2/I1.$$

The variable T is a constant, which depends essentially on the inductance and the ohmic resistance of the coil.

Starting with instant T2, switch 140 is driven again with a pulse-width modulated signal. The pulse-duty factor is selected so as to adjust current I2. The period of time DT between instants Ti and T2 is selected so as to adjust the second specific current value I2 and, thus, a specific flow rate.

As a result, the pressure P2 rises over time. For the period of time DT, the relation applies:

$$DT = -T*\ln((FF + FD - FZ - B)/A*I2)$$

To be able to adjust a specific resulting force FZ and, thus, a specific pressure gradient, the differential pressure FD between the first and the second line has to be calculated and/or measured. The remaining variables are constants and can be fixed. Given a known differential pressure, by specifying the time DT, any desired current value I2 and, thus, any desired resulting force and, thus, a specific pressure gradient can be adjusted.

By specifying the time DT in which switching element 140 is open, a specific current value I2 is adjusted. Current value I2 is that current value which is required to hold the solenoid valve in a dosing position or to adjust a desired pressure gradient.

Between instants T2 and T3, the solenoid valve is situated in an intermediate position between the closed position and the open position. During this time, the pressure P2 rises over the time t with a specific slope angle, which is described as the pressure gradient. The slope angle of the pressure rise is a function of current value I2 and can be adjusted by specifying the time DT and/or by specifying the pulse duty factor. The time interval between instants T2 and T3 determines the value of pressure P2 and, thus, the braking force. As a function of the time duration DT, the current drops to different values I2. Thus, different pressure gradients result, and pressure can build up at different rates when working with pressure P2. The longer the time interval DT is, the more sharply the current drops and the further the solenoid valve opens. In this phase, the 2/2 solenoid valve is so driven that it performs similarly to a proportional valve.

At instant T3, the pulse duty factor is again increased to the value 1, the consequence being that the current which flows through coil 130 rises again in accordance with an E-function to the original value I1, and the solenoid valve goes over again to its closed position. As a result, the pressure P2 remains at a constant level. The current I rises exponentially in this phase again to its initial value.

In the preferred example, the pulse duty factor, which is drawn in with a solid line, decreases somewhat over time between instants T2 and T3. As a result, the current which flows through the solenoid valve likewise decreases somewhat. This takes place against the background that the pressure difference, that is the difference between the pressure P2 and P1, is reduced in this time phase. As a result, the force FD, which is a function of the differential pressure, is also reduced. Therefore, only a slight magnetic force FM has to be applied by coil 130 to retain the solenoid valve in the position it has reached. This means that in the second phase between instants T2 and T3, the current tracks the pressure change over time. The decrease in current between instants T2 and T3 is less than in the time span DT.

We claim:

1. A method for driving an electromagnetic valve, comprising the steps of:

positioning the valve in a first position when a current signal assumes a first current value;

positioning the valve in a second position when the current signal assumes a second current value; and controlling the valve via the current signal following a switch over, wherein the current signal transitions from the first current value to a third current value in a specified time interval according to a first function during a first phase, and, in a second phase, the current signal assumes at least one of a substantially constant value and a value corresponding to a pressure change over time, and wherein the third current value is between the first current value and the second current value.

2. A method according to claim 1, wherein the first function is specified such that the current signal assumes the third current value following the specified time interval.

3. The method according to claim 1, further comprising the step of presetting at least one of the third current value and the specified time interval according to at least one of a pressure differential and a pressure gradient.

4. The method according to claim 1, wherein the valve is a supply valve of a braking system having at least one of antilock protection and a traction control system.

5. A device for driving an electromagnetic valve, comprising:

a valve controller;

wherein the valve controller controls the valve via a current signal; wherein the valve controller positions the valve in a first position when the current signal assumes a first current value and positions the valve in a second position when the current signal assumes a second current value; and wherein the valve controller, following a switch over, transitions the current signal from the first current value to a third current value in a specified time interval according to a first function during a first phase, the third current value being between the first current value and the second current value, and, in a second phase, forces the current signal to assume at least one of a substantially constant value and a value corresponding to a pressure change over time.

* * * * *